(12) United States Patent
Iwai

(10) Patent No.: US 12,116,276 B2
(45) Date of Patent: Oct. 15, 2024

(54) HYDROGEN GAS PRODUCTION DEVICE

(71) Applicant: Yoshiro Iwai, Hyogo (JP)

(72) Inventor: Yoshiro Iwai, Hyogo (JP)

( * ) Notice: Subject to any disclaimer, the term of this patent is extended or adjusted under 35 U.S.C. 154(b) by 715 days.

(21) Appl. No.: 17/288,649

(22) PCT Filed: May 15, 2019

(86) PCT No.: PCT/JP2019/019204
§ 371 (c)(1),
(2) Date: Apr. 26, 2021

(87) PCT Pub. No.: WO2020/095467
PCT Pub. Date: May 14, 2020

(65) Prior Publication Data
US 2021/0395082 A1    Dec. 23, 2021

(30) Foreign Application Priority Data

Nov. 9, 2018  (JP) .................................. 2018-211243

(51) Int. Cl.
*C01B 3/04*  (2006.01)
(52) U.S. Cl.
CPC ...... *C01B 3/047* (2013.01); *C01B 2203/0272* (2013.01); *C01B 2203/0405* (2013.01);
(Continued)
(58) Field of Classification Search
CPC ............ C01B 3/047; C01B 2203/0272; C01B 2203/0405; C01B 2203/066;
(Continued)

(56) References Cited

U.S. PATENT DOCUMENTS

| 11,084,719 B2 | 8/2021 | Andersen et al. |
| 2002/0028171 A1 | 3/2002 | Goetsch et al. |

(Continued)

FOREIGN PATENT DOCUMENTS

| JP | H05-332152 A | 12/1993 |
| JP | 2008-536795 A | 9/2008 |

(Continued)

OTHER PUBLICATIONS

Office Action in corresponding JP app. 2018-211243 dated Jun. 7, 2022 (pp. 1-4) and english translation thereof (pp. 1-4).

(Continued)

*Primary Examiner* — Anthony J Zimmer
*Assistant Examiner* — Syed T Iqbal
(74) *Attorney, Agent, or Firm* — Millen, White, Zelano & Branigan P.C.; William F. Nixon

(57) ABSTRACT

A hydrogen gas production apparatus 1 includes: a vaporizer 5 configured to generate ammonia gas by heating liquid ammonia; a main thermal decomposition device 6 configured to decompose the ammonia gas generated in the vaporizer 5, into nitrogen gas and hydrogen gas, by heating the ammonia gas by causing a fuel gas to burn; a cooler 7 configured to cool a decomposition gas including the nitrogen gas and the hydrogen gas generated through the decomposition in the main thermal decomposition device 6; and a separator 8 configured to separate hydrogen gas from the decomposition gas having been cooled.

2 Claims, 1 Drawing Sheet

(52) U.S. Cl.
CPC ............ *C01B 2203/066* (2013.01); *C01B 2203/0822* (2013.01); *C01B 2203/085* (2013.01); *C01B 2203/0883* (2013.01); *C01B 2203/1288* (2013.01); *C01B 2203/169* (2013.01)

(58) Field of Classification Search
CPC ...... C01B 2203/0822; C01B 2203/085; C01B 2203/0883; C01B 2203/1288; C01B 2203/169; C01B 2203/04; C01B 3/50; Y02E 60/36; Y02E 60/50; C01C 1/10; H01M 8/0606
See application file for complete search history.

(56) References Cited

U.S. PATENT DOCUMENTS

| | | | | |
|---|---|---|---|---|
| 2006/0112636 | A1* | 6/2006 | Chellappa | H01M 16/006 423/658.2 |
| 2012/0167840 | A1 | 7/2012 | Miyagawa et al. | |

FOREIGN PATENT DOCUMENTS

| | | |
|---|---|---|
| JP | 2010-265138 A | 11/2010 |
| JP | 4990267 B2 | 8/2012 |
| JP | 2017-025840 A | 2/2017 |
| WO | 2017160154 A1 | 9/2017 |
| WO | 2018116982 A1 | 6/2018 |

OTHER PUBLICATIONS

Search report in corresponding EP application 19881372.7 dated Jul. 22, 2022 (pp. 1-7).
English Translation of International Search Report for PCT/JP2019/019204 dated Aug. 6, 2019.
English Machine Translation for WO-2018116982, Publication Date: Jun. 28, 2018.
English Machine Translation for JP-H05332152, Publication Date: Dec. 14, 1993.
English Machine Translation for JP-2017025840, Publication Date: Feb. 2, 2017.
English Machine Translation for JP-2010265138, Publication Date: Nov. 25, 2010.

* cited by examiner

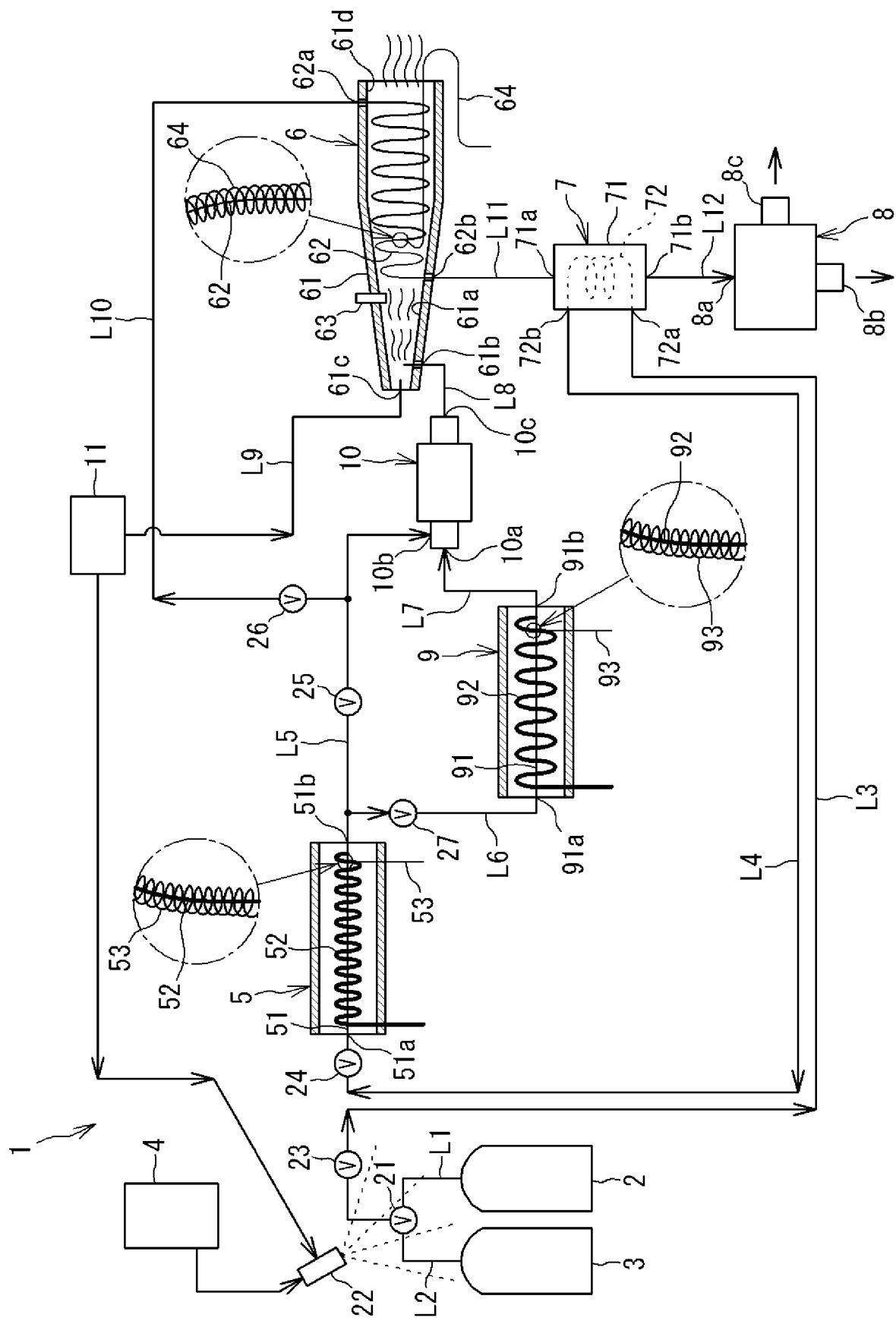

HYDROGEN GAS PRODUCTION DEVICE

TECHNICAL FIELD

The present invention relates to a hydrogen gas production apparatus.

BACKGROUND ART

In recent years, from a viewpoint of preserving the environment such as prevention of global warming, fuel cells that generate power by using hydrogen as a renewable fuel have been attracting attention. PATENT LITERATURE 1 discloses, as a method for producing hydrogen gas to serve as a fuel for a fuel cell, a method for generating hydrogen gas by reacting liquid ammonia and a metal hydride.

CITATION LIST

Patent Literature

PATENT LITERATURE 1: Japanese Laid-Open Patent Publication No. 2010-265138

SUMMARY OF INVENTION

Technical Problem

However, the above conventional method for producing hydrogen gas needs to use an expensive metal hydride. Therefore, there is a problem that hydrogen gas cannot be produced at low cost.

The present invention has been made in view of the above circumstances. An object of the present invention is to provide a hydrogen gas production apparatus that can produce hydrogen gas at low cost.

Solution to Problem

A hydrogen gas production apparatus of the present invention includes: a vaporizer configured to generate ammonia gas by heating liquid ammonia; a main thermal decomposition device configured to decompose the ammonia gas generated in the vaporizer, into nitrogen gas and hydrogen gas, by heating the ammonia gas by causing a fuel gas to burn; a cooler configured to cool a first decomposition gas including the nitrogen gas and the hydrogen gas generated through the decomposition in the main thermal decomposition device; and a separator configured to separate hydrogen gas from the first decomposition gas having been cooled.

According to this hydrogen gas production apparatus, liquid ammonia is heated in the vaporizer to generate ammonia gas, and a fuel gas is caused to burn in the main thermal decomposition device, whereby the ammonia gas is heated to be decomposed into nitrogen gas and hydrogen gas. Then, a first decomposition gas including the nitrogen gas and the hydrogen gas generated through decomposition is cooled in the cooler, and then, hydrogen gas is separated from the first decomposition gas by the separator. Accordingly, hydrogen gas can be produced from liquid ammonia, and thus, hydrogen gas can be produced at low cost when compared with a conventional case where a metal hydride is used.

Preferably, the hydrogen gas production apparatus includes: a sub thermal decomposition device configured to decompose a portion of the ammonia gas generated in the vaporizer, into nitrogen gas and hydrogen gas, by heating the portion of the ammonia gas; and a mixer configured to mix a second decomposition gas including the nitrogen gas and the hydrogen gas generated through the decomposition in the sub thermal decomposition device, and another portion of the ammonia gas generated in the vaporizer, to generate the fuel gas. The main thermal decomposition device heats a remainder of the ammonia gas generated in the vaporizer, by causing the fuel gas to burn together with air.

In this case, a portion of ammonia gas for producing hydrogen gas can be used as a fuel gas to be burned in the main thermal decomposition device. Therefore, the fuel gas need not be separately prepared.

Preferably, the cooler cools the first decomposition gas by allowing heat exchange between the liquid ammonia and the first decomposition gas.

In this case, liquid ammonia for producing hydrogen gas can be used as a cooling medium for cooling the first decomposition gas in the cooler. Therefore, the cooling medium need not be separately prepared.

Preferably, the vaporizer generates ammonia gas by heating the liquid ammonia having undergone the heat exchange in the cooler.

In this case, the liquid ammonia can be preheated by the heat of the first decomposition gas in the cooler. Therefore, ammonia gas can be efficiently generated from the liquid ammonia in the vaporizer.

Advantageous Effects of Invention

According to the hydrogen gas production apparatus of the present invention, hydrogen gas can be produced at low cost.

BRIEF DESCRIPTION OF DRAWINGS

FIG. 1 is a schematic diagram showing a configuration of a hydrogen gas production apparatus according to an embodiment of the present invention.

DESCRIPTION OF EMBODIMENTS

Hereinafter, an embodiment of the present disclosure is described with reference to the drawing.

FIG. 1 is a schematic diagram showing a configuration of a hydrogen gas production apparatus according to an embodiment of the present disclosure. In FIG. 1, a hydrogen gas production apparatus 1 of the present embodiment is provided, for example, in an on-vehicle fuel cell system (not shown) that generates power by causing hydrogen gas and oxygen gas to undergo chemical reaction. The hydrogen gas production apparatus 1 produces the hydrogen gas as a fuel.

The hydrogen gas production apparatus 1 includes a plurality of tanks 2, 3, and 4. The tanks 2 and 3 each store liquid ammonia. A first flow path L1 and a second flow path L2 have one ends connected to a switching valve 21, and have the other ends respectively connected to the tanks 2 and 3. In addition, a third flow path L3 is connected to the switching valve 21. The switching valve 21 switches between a first switching position at which the third flow path L3 is connected to the first flow path L1, and a second switching position at which the third flow path L3 is connected to the second flow path L2. For example, when the remaining amount of the liquid ammonia in the tank 2 has become little, the switching valve 21 is switched from the first switching position to the second switching position, and when the remaining amount of the liquid ammonia in the tank 3 has become little, the switching valve 21 is switched from the second switching position to the first switching position.

The tank 4 stores a coolant for cooling the liquid ammonia in the tanks 2 and 3, in a case where a fire or the like has occurred in the vicinity and the temperature of the liquid ammonia has risen to a dangerous temperature (e.g., 40° C.), for example. As the coolant, a dilute hydrochloric acid water is used, for example.

A spray nozzle 22 is connected to the tank 4. The spray nozzle 22 sprays the coolant toward the tanks 2 and 3, using pressurized air supplied from an air supply source 11 described later.

The hydrogen gas production apparatus 1 further includes a vaporizer 5, a sub thermal decomposition device 9, and a mixer 10.

The vaporizer 5 generates ammonia gas by heating liquid ammonia supplied from the tank 2, 3. The vaporizer 5 includes: an inner tube 51; a heater 52 provided at the outer periphery of the inner tube 51; and a temperature detection sensor 53 which detects the temperature of the heater 52.

One end of the inner tube 51 is an introduction port 51a for introducing liquid ammonia into the inside of the inner tube 51, and the other end of the inner tube 51 is a discharge port 51b for discharging, to the outside, ammonia gas generated from the liquid ammonia inside the inner tube 51.

One end of a fourth flow path L4 is connected to the introduction port 51a. The other end of the fourth flow path L4 is connected to an end portion of the third flow path L3 via a cooler 7 described later. Accordingly, the liquid ammonia in the tank 2, 3 is introduced into the inner tube 51 of the vaporizer 5 via the third flow path L3, the cooler 7, and the fourth flow path L4. An adjustment valve 24 which adjusts the introduction amount of liquid ammonia into the vaporizer 5 is provided at a position in the fourth flow path L4.

The heater 52 is implemented as a heating wire such as a nichrome wire that generates heat due to application of current. The heater 52 is helically wound along the outer periphery of the inner tube 51. Accordingly, the heater 52 heats the liquid ammonia introduced into the inner tube 51. For the heater 52, another heat source such as heat ray, plasma heat, hot air, infrared radiation, or electromagnetic wave may be used, other than the heating wire.

The temperature detection sensor 53 is implemented as a thermocouple element wire, for example, and is mounted by being wound around a portion of the heater 52. The temperature detection sensor 53 measures the temperature of the heater 52, whereby application of current to the heater 52 is controlled. In the present embodiment, application of current to the heater 52 is controlled such that the temperature of the heater 52 is around 100° C. For the application of current to the heater 52, an on-vehicle battery (not shown) is used in the initial stage of operation of the fuel cell system, and power generated in the fuel cell system is used after the initial stage of operation of the fuel cell system.

A fifth flow path L5 is connected to the discharge port 51b of the inner tube 51 of the vaporizer 5. The sub thermal decomposition device 9 is connected to an end portion of a sixth flow path L6 which is branched at a position in the fifth flow path L5. Accordingly, a portion of the ammonia gas discharged from the vaporizer 5 is introduced into an inner tube 91 of the sub thermal decomposition device 9 via the sixth flow path L6 from a position in the fifth flow path L5.

The sub thermal decomposition device 9 heats a portion of the ammonia gas generated in the vaporizer 5, to cause endothermic decomposition reaction into nitrogen gas ($N_2$) and hydrogen gas ($H_2$) as represented by formula (1) below.

$$2NH_3 \rightarrow N_2 + 3H_2 \tag{1}$$

The sub thermal decomposition device 9 includes: the inner tube 91; a heater 92 provided at the outer periphery of the inner tube 91; and a temperature detection sensor 93 which detects the temperature of the heater 92. One end of the inner tube 91 is an introduction port 91a for introducing ammonia gas into the inside of the inner tube 91, and the other end of the inner tube 91 is a discharge port 91b for discharging, to the outside, a decomposition gas (second decomposition gas) including nitrogen gas and hydrogen gas generated through decomposition of the ammonia gas.

The heater 92 is implemented as a heating wire such as a nichrome wire that generates heat due to application of current, similar to the heater 52 of the vaporizer 5. The heater 92 is helically wound along the outer periphery of the inner tube 91. Accordingly, the heater 92 heats the ammonia gas introduced into the inner tube 91. For the heater 92, another heat source such as heat ray, plasma heat, hot air, infrared radiation, or electromagnetic wave may be used, other than the heating wire.

The temperature detection sensor 93 is implemented as a thermocouple element wire, for example, similar to the temperature detection sensor 53 of the vaporizer 5, and is mounted by being wound around a portion of the heater 92. The temperature detection sensor 93 measures the temperature of the heater 92, whereby application of current to the heater 92 is controlled. In the present embodiment, application of current to the heater 92 is controlled such that the temperature of the heater 92 is 500° C. to 700° C. For the application of current to the heater 92, an on-vehicle battery is used in the initial stage of operation of the fuel cell system, and power generated in the fuel cell system is used after the initial stage of operation of the fuel cell system.

A seventh flow path L7 is connected to the discharge port 91b of the sub thermal decomposition device 9, and the mixer 10 is connected to an end portion of the seventh flow path L7. Accordingly, the decomposition gas discharged from the sub thermal decomposition device 9 is introduced into the mixer 10 via the seventh flow path L7.

An end portion of the fifth flow path L5 extending from the vaporizer 5 is also connected to the mixer 10. Accordingly, another portion of the ammonia gas discharged from the discharge port 51b of the vaporizer 5 is also introduced into the mixer 10 via the fifth flow path L5.

The mixer 10 generates a fuel gas by mixing the decomposition gas generated through decomposition in the sub thermal decomposition device 9, and another portion of the ammonia gas generated in the vaporizer 5.

The mixer 10 includes: a first introduction port 10a for introducing the decomposition gas generated through decomposition in the sub thermal decomposition device 9; a second introduction port 10b for introducing the ammonia gas generated in the vaporizer 5; and a discharge port 10c for discharging a mixed gas generated through mixing inside the mixer 10.

An end portion of the seventh flow path L7 is connected to the first introduction port 10a, and an end portion of the fifth flow path L5 is connected to the second introduction port 10b. Accordingly, the decomposition gas introduced from the first introduction port 10a is mixed with the ammonia gas introduced from the second introduction port 10b.

The hydrogen gas production apparatus 1 further includes a main thermal decomposition device 6 and an air supply source 11.

The main thermal decomposition device 6 causes the fuel gas to burn, thereby heating the remainder (ammonia gas remaining, without being introduced into the sub thermal decomposition device 9 and the mixer 10) of the ammonia gas generated in the vaporizer 5, to cause endothermic decomposition reaction into nitrogen gas and hydrogen gas as represented by formula (1) above.

The main thermal decomposition device 6 includes: a cylindrical case 61 having a combustion chamber 61a formed therein; a helical inner tube 62 provided in the case 61; an ignition plug 63 which ignites the fuel gas supplied into the combustion chamber 61a; and a temperature detection sensor 64 which detects the temperature of the combustion chamber 61a.

A first introduction port 61b for introducing the fuel gas is formed in one end portion in the longitudinal direction of the case 61. An end portion of an eighth flow path L8 extending from the discharge port 10c of the mixer 10 is connected to the first introduction port 61b. Accordingly, a fuel gas discharged from the mixer 10 is introduced into the combustion chamber 61a of the case 61 via the eighth flow path L8.

In addition, a second introduction port 61c for introducing air is formed in one end portion in the longitudinal direction of the case 61. An end portion of a ninth flow path L9 extending from the air supply source 11 is connected to the second introduction port 61c. The air supply source 11 is implemented as an air compressor, for example, and supplies pressurized air (e.g., air pressurized to 0.2 MPa to 0.3 MPa) to the combustion chamber 61a of the case 61 via the ninth flow path L9. This pressurized air facilitates combustion of the fuel gas in the combustion chamber 61a. The other end in the longitudinal direction of the case 61 is a discharge port 61d for discharging exhaust gas resulting from the combustion of the fuel gas.

One end of the inner tube 62 is an introduction port 62a for introducing ammonia gas generated in the vaporizer 5 into the inside of the inner tube 62. The introduction port 62a is open at the outer periphery on the discharge port 61d side of the case 61. An end portion of a tenth flow path L10 which is branched at a position in the fifth flow path L5 is connected to the introduction port 62a. Accordingly, the aforementioned remainder of the ammonia gas generated in the vaporizer 5 is introduced into the inner tube 62 of the main thermal decomposition device 6 via the tenth flow path L10.

The other end of the inner tube 62 is a discharge port 62b for discharging a decomposition gas (first decomposition gas) including nitrogen gas and hydrogen gas generated through decomposition of ammonia gas, to the outside of the case 61. The discharge port 62b is open at the outer periphery in an intermediate portion in the longitudinal direction of the case 61.

The ignition plug 63 is provided between the discharge port 62b of the inner tube 62 and the second introduction port 61c for introducing air, at the outer periphery of the case 61. The ignition plug 63 causes a spark in the combustion chamber 61a, thereby being able to cause the fuel gas to burn in the combustion chamber 61a.

Similar to the temperature detection sensor 53 of the vaporizer 5, the temperature detection sensor 64 is implemented as a thermocouple element wire, for example, and is mounted by being wound around a portion of the inner tube 62. The temperature detection sensor 64 measures the temperature of the combustion chamber 61a, whereby the introduction amounts and the like of the fuel gas and the pressurized air are controlled such that the temperature of the combustion chamber 61a is 500° C. to 900° C.

Adjustment valves 25 and 26 which adjust the introduction amounts of ammonia gas into the mixer 10 and the main thermal decomposition device 6 are provided at a position in the fifth flow path L5 and at a position in the tenth flow path L10, respectively. In addition, an adjustment valve 27 which adjusts the introduction amount of ammonia gas into the sub thermal decomposition device 9 is provided at a position in the sixth flow path L6. In the present embodiment, the adjustment valves 25 to 27 are controlled such that: a small amount of ammonia gas is introduced into each of the mixer 10 and the sub thermal decomposition device 9; and a large amount of ammonia gas is introduced into the main thermal decomposition device 6.

According to the above, in the main thermal decomposition device 6, the fuel gas introduced from the mixer 10 into the combustion chamber 61a burns together with the air introduced from the air supply source 11 into the combustion chamber 61a, whereby the large amount of ammonia gas introduced from the introduction port 62a of the inner tube 62 into the inside thereof is efficiently heated, and undergoes endothermic decomposition to be decomposed into large amounts of nitrogen gas and hydrogen gas. Then, the decomposition gas including the large amounts of nitrogen gas and hydrogen gas generated through decomposition is discharged from the discharge port 62b of the inner tube 62, to the outside.

The hydrogen gas production apparatus 1 further includes the cooler 7 and a separator 8.

The cooler 7 is connected to an end portion of an eleventh flow path L11 extending from the discharge port 62b of the inner tube 62 of the main thermal decomposition device 6. The cooler 7 cools the decomposition gas generated through decomposition in the main thermal decomposition device 6. The cooler 7 of the present embodiment allows heat exchange between liquid ammonia before being introduced into the vaporizer 5 and the decomposition gas generated through decomposition in the main thermal decomposition device 6, thereby cooling the decomposition gas.

The cooler 7 includes a cylindrical case 71 and a helical inner tube 72 provided in the case 71.

One end of the inner tube 72 is an introduction port 72a for introducing liquid ammonia before being introduced into the vaporizer 5, into the inside of the inner tube 72. The introduction port 72a is open at the outer periphery on the one end side in the longitudinal direction of the case 71. An end portion of the third flow path L3 extending from the switching valve 21 is connected to the introduction port 72a. Accordingly, liquid ammonia at a low temperature (e.g., −50° C.) is introduced into the inner tube 72 of the cooler 7 from the tank 2, 3 via the switching valve 21 and the third flow path L3. An adjustment valve 23 which adjusts the introduction amount of ammonia gas into the inner tube 72 is provided at a position in the third flow path L3.

The other end of the inner tube 72 is a discharge port 72b for discharging, to the outside, the liquid ammonia having undergone heat exchange inside the inner tube 72. The discharge port 72b is open at the outer periphery on the other end side in the longitudinal direction of the case 71. An end portion of the fourth flow path L4 extending from the vaporizer 5 is connected to the discharge port 72b. Accordingly, the liquid ammonia having undergone heat exchange in the inner tube 72 of the cooler 7 is introduced from the discharge port 72b via the fourth flow path L4 into the inner tube 51 of the vaporizer 5. Accordingly, the vaporizer 5 of the present embodiment heats the liquid ammonia having undergone heat exchange in the cooler 7, to generate ammonia gas.

An introduction port 71a for introducing, into the case 71, the decomposition gas at a high temperature (500° C. to 900° C.) generated through decomposition in the main thermal decomposition device 6 is formed at an end face on the other end side of the case 71. A discharge port 71b for discharging, to the outside, the decomposition gas having undergone heat exchange in the case 71 is formed at an end face on the one end side of the case 71.

Due to the above configuration, in the case 71 of the cooler 7, when the decomposition gas at a high temperature passes from the introduction port 71a toward the discharge port 71b, heat exchange occurs between the decomposition gas at a high temperature and the liquid ammonia at a low temperature introduced into the inner tube 72. That is, the decomposition gas at a high temperature is cooled by the liquid ammonia at a low temperature, and the liquid ammonia at a low temperature is preheated to a predetermined temperature by the decomposition gas at a high temperature. In the present embodiment, the decomposition gas at a high temperature is cooled to about 50° C. by the liquid ammonia at a low temperature.

The separator 8 separates hydrogen gas from the decomposition gas cooled in the cooler 7. The separator 8 of the present embodiment separates only hydrogen gas from the decomposition gas including nitrogen gas and hydrogen gas, by means of a hollow fiber gas separation membrane (not shown) provided in the separator 8.

The separator 8 includes: an introduction port 8a for introducing the decomposition gas cooled in the cooler 7; a first discharge port 8b for discharging the hydrogen gas separated from the decomposition gas; and a second discharge port 8c for discharging the decomposition gas (nitrogen gas) other than hydrogen gas.

According to the hydrogen gas production apparatus 1 of the present embodiment, liquid ammonia is heated in the vaporizer 5 to generate ammonia gas, and a fuel gas is caused to burn in the main thermal decomposition device 6, whereby the ammonia gas is heated to be decomposed into nitrogen gas and hydrogen gas. Then, the decomposition gas including the nitrogen gas and the hydrogen gas generated through decomposition is cooled in the cooler 7, and then, hydrogen gas is separated from the decomposition gas by the separator 8. Accordingly, hydrogen gas can be produced from liquid ammonia, and thus, hydrogen gas can be produced at low cost when compared with a conventional case where a metal hydride is used.

A portion of the ammonia gas generated in the vaporizer 5 is heated in the sub thermal decomposition device 9, to be decomposed into nitrogen gas and hydrogen gas. Then, a decomposition gas including the nitrogen gas and the hydrogen gas, and another portion of the ammonia gas generated in the vaporizer 5 are mixed in the mixer 10, to generate a fuel gas. Accordingly, a portion of ammonia gas for producing hydrogen gas can be used as a fuel gas to be burned in the main thermal decomposition device 6. Therefore, the fuel gas need not be separately prepared.

The cooler 7 allows heat exchange between liquid ammonia at a low temperature before being introduced into the vaporizer 5 and the decomposition gas at a high temperature generated through decomposition in the main thermal decomposition device 6, thereby cooling the decomposition gas. Accordingly, the liquid ammonia for producing hydrogen gas can be used as a cooling medium for cooling the decomposition gas in the cooler 7. Therefore, the cooling medium need not be separately prepared.

The vaporizer 5 heats the liquid ammonia having undergone heat exchange in the cooler 7, to generate ammonia gas. Therefore, the liquid ammonia can be preheated by the heat of the decomposition gas at a high temperature in the cooler 7. Therefore, ammonia gas can be efficiently generated from the liquid ammonia in the vaporizer 5.

In the above embodiment, a portion of ammonia gas for producing hydrogen gas is used as a fuel gas to be burned in the main thermal decomposition device 6. However, a fuel gas such as ammonia gas may be separately prepared. The vaporizer 5 of the above embodiment heats the liquid ammonia having undergone heat exchange in the cooler 7, to generate ammonia gas. However, the liquid ammonia may be directly introduced from the tank 2, 3 into the vaporizer 5 and heated therein, to generate ammonia gas. In the above embodiment, the liquid ammonia for producing hydrogen gas is used as a cooling medium for cooling the decomposition gas in the cooler 7. However, the cooling medium in the cooler 7 may be separately prepared.

Other than for production of hydrogen gas to serve as a fuel for a fuel cell system, the hydrogen gas production apparatus of the present disclosure can also be applied to production of hydrogen gas to be used in another usage, such as production of hydrogen gas to serve as a fuel for a hydrogen engine.

When hydrogen gas produced by the hydrogen gas production apparatus of the present disclosure is used as a fuel for a hydrogen engine implemented as a reciprocating engine (including a diesel engine) together with pure hydrogen gas (including commercial hydrogen gas and hydrogen rich gas), a backfire may occur in rare cases. Therefore, when a hydrogen engine (reciprocating engine) is to be ignited, while the number of revolutions of the engine is 0 to 400 rpm at the start or end of operation, if a starting or ending operation is carried out by using a starter motor without a fuel being supplied, the backfire can be prevented.

In order to prevent a backfire without stopping fuel supply, the ignition position is adjusted so as to be lower than the top dead center by about 5 to 20 degrees at the critical number of revolution of the engine, whereby the backfire can be prevented.

Further, when the number of revolutions is shifted to 0 to 400 rpm or higher for high speed operation (normal operation) to improve fuel consumption, the ignition position may be caused to be a little higher, i.e., by about 5 to 10 degrees, than the top dead center. However, toward engine stop, the fuel valve is closed, and when the number of revolutions of the engine has reached the critical number of revolution, the ignition position may be lowered again.

The embodiment described above is merely illustrative and is not restrictive in all aspects. The scope of the present disclosure is defined by the scope of the claims, and all changes which come within the range of equivalency of the configurations recited in the claims are therefore intended to be included in the technical scope of the present disclosure.

REFERENCE SIGNS LIST 1 hydrogen gas production apparatus
2 to 4 tank
5 vaporizer
6 main thermal decomposition device
7 cooler
8 separator
8a introduction port 8b first discharge port
8c second discharge port
9 sub thermal decomposition device
10 mixer
10a first introduction port
10b second introduction port
10c discharge port
11 air supply source
21 switching valve
22 spray nozzle
23 to 27 adjustment valve
51 inner tube
51a introduction port
51b discharge port
52 heater
53 temperature detection sensor
61 case
61a combustion chamber
61b first introduction port
61c second introduction port
61d discharge port
62 inner tube
62a introduction port
62b discharge port
63 ignition plug
64 temperature detection sensor
71 case
71a introduction port
71b discharge port
72 inner tube
72a introduction port
72b discharge port
91 inner tube
91a introduction port
91b discharge port
92 heater
93 temperature detection sensor
L1 first flow path
L2 second flow path
L3 third flow path
L4 fourth flow path
L5 fifth flow path
L6 sixth flow path
L7 seventh flow path
L8 eighth flow path
L9 ninth flow path
L10 tenth flow path
L11 eleventh flow path

The invention claimed is:

1. A hydrogen gas production apparatus comprising:
a vaporizer configured to generate ammonia gas by heating liquid ammonia;
a main thermal decomposition device configured to decompose the ammonia gas generated in the vaporizer, into nitrogen gas and hydrogen gas, by heating the ammonia gas by causing a fuel gas to burn;
a cooler configured to cool a first decomposition gas including the nitrogen gas and the hydrogen gas generated through the decomposition in the main thermal decomposition device; and
a separator configured to separate hydrogen gas from the first decomposition gas having been cooled,
wherein the cooler is configured to cool the first decomposition gas by allowing heat exchange between the liquid ammonia before being introduced into the vaporizer and the first decomposition gas, and
the vaporizer generates ammonia gas by heating the liquid ammonia having undergone the heat exchange in the cooler.

2. The hydrogen gas production apparatus according to claim 1, further comprising:
a sub thermal decomposition device configured to decompose a portion of the ammonia gas generated in the vaporizer, into nitrogen gas and hydrogen gas, by heating the portion of the ammonia gas; and
a mixer configured to mix a second decomposition gas including the nitrogen gas and the hydrogen gas generated through the decomposition in the sub thermal decomposition device, and another portion of the ammonia gas generated in the vaporizer, to generate the fuel gas, wherein
the main thermal decomposition device heats a remainder of the ammonia gas generated in the vaporizer, by causing the fuel gas to burn together with air.

* * * * *